US005896388A

United States Patent [19]
Earnest

[11] Patent Number: 5,896,388
[45] Date of Patent: Apr. 20, 1999

[54] METHOD AND APPARATUS USING GPS TO RESHAPE ISOCHRONOUS DATA AT THE RECEIVING ENDS OF AN ATM NETWORK

[75] Inventor: Timothy J. Earnest, Vadnais Heights, Minn.

[73] Assignee: NCR Corporation, Dayton, Ohio

[21] Appl. No.: 08/872,455

[22] Filed: Jun. 10, 1997

Related U.S. Application Data

[63] Continuation of application No. 08/669,858, Jun. 26, 1996, abandoned, which is a continuation of application No. 08/387,659, Feb. 13, 1995, abandoned.

[51] Int. Cl.$^6$ .................................................. H04L 12/56
[52] U.S. Cl. ............................................ 370/395; 370/517
[58] Field of Search ...................................... 370/252, 389, 370/395, 396, 353, 503, 507, 508, 509, 516–519; 375/354, 356, 358; 455/502; 348/423

[56] References Cited

U.S. PATENT DOCUMENTS

| | | | |
|---|---|---|---|
| 4,551,833 | 11/1985 | Turner | 370/94.1 |
| 4,607,257 | 8/1986 | Noguchi | 370/104.1 |
| 5,068,654 | 11/1991 | Husher | 455/51.1 |
| 5,367,524 | 11/1994 | Rideout et al. | 370/104.1 |
| 5,379,299 | 1/1995 | Schwartz | 370/108 |
| 5,381,408 | 1/1995 | Brent et al. | 370/94.1 |
| 5,402,424 | 3/1995 | Kou | 370/104.1 |
| 5,440,591 | 8/1995 | Liron et al. | 370/108 |
| 5,450,394 | 9/1995 | Gruber et al. | 375/354 |
| 5,467,342 | 11/1995 | Logston et al. | 370/60.1 |
| 5,510,797 | 4/1996 | Abraham et al. | 455/51.1 |

*Primary Examiner*—Chau Nguyen
*Attorney, Agent, or Firm*—Ying Tuo

[57] ABSTRACT

Method and apparatus are used to reshape isochronous Constant Bit Rate (CBR) and Variable Bit Rate (VBR) data at a receiving point (such as a multimedia workstation) using precise universal real time clocks that are provided by Global Position System (GPS) satellites.

19 Claims, 12 Drawing Sheets

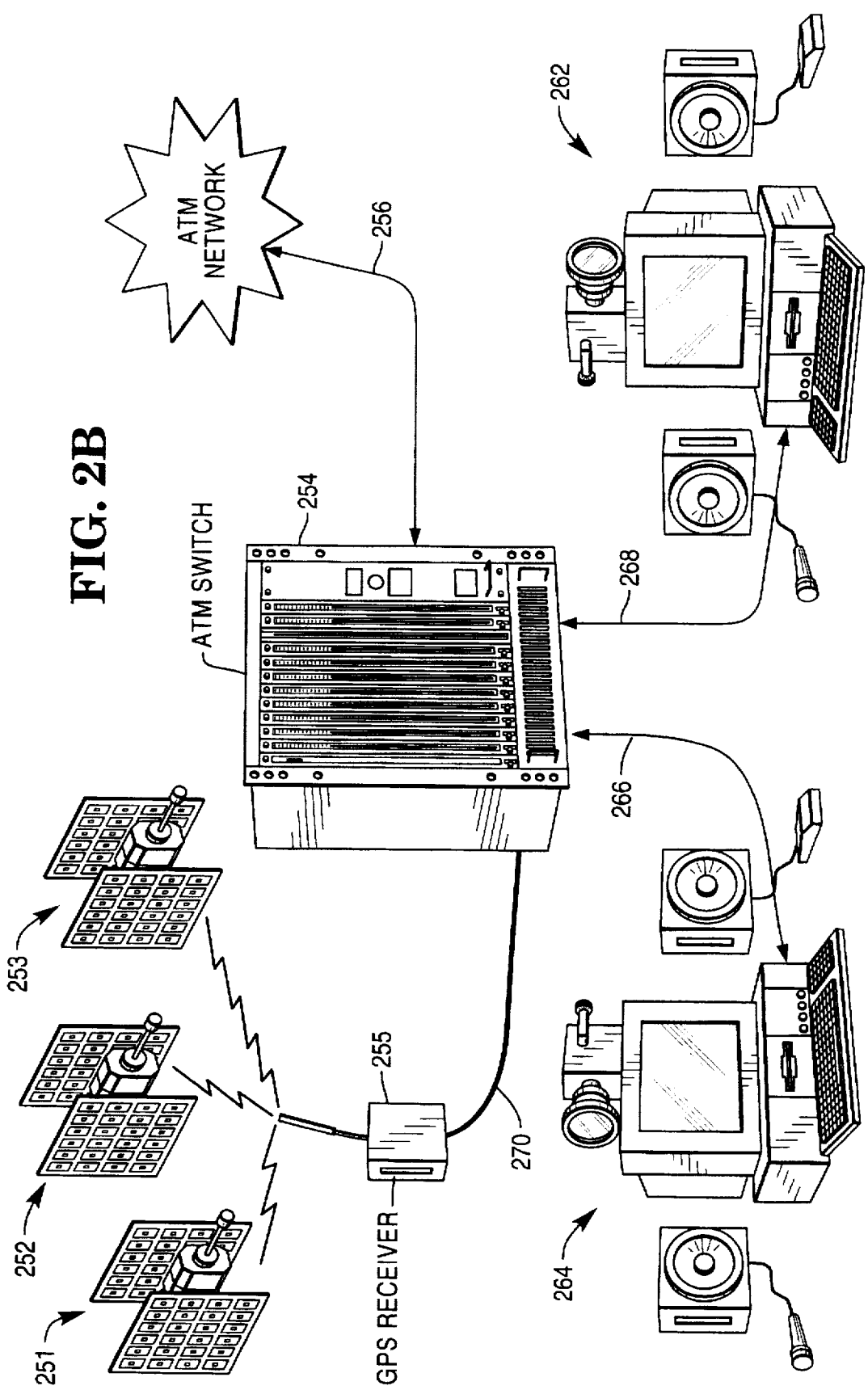

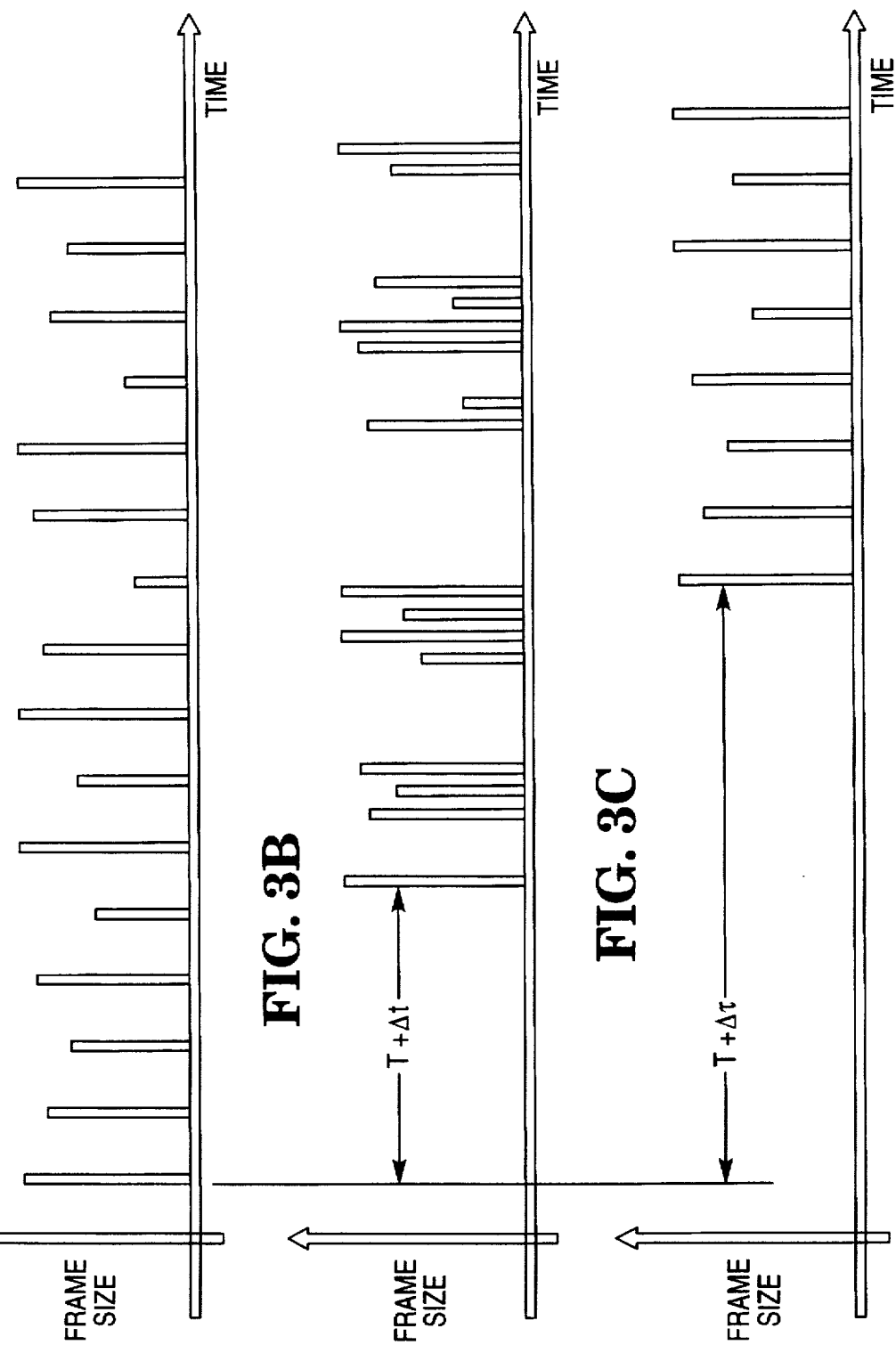

METHOD AND APPARATUS USING GPS TO RESHAPE ISOCHRONOUS DATA AT THE RECEIVING ENDS OF AN ATM NETWORK

This is a continuation of application Ser. No. 08/669,858, filed on Jun. 26, 1996, abandoned, which is a continuation of Ser. No. 08/387,659, filed Feb. 13, 1995, abandoned.

BACKGROUND OF THE INVENTION

This invention relates to data communication networks, and in particular, to ATM networks for transmitting and receiving isochronous data.

In the data communications process, a sending station can transfer isochronous audio and video data into an ATM network on frame-by-frame basis at a constant rate. Each frame can contain many ATM cells. In transit through the ATM network, the data at a receiving station will be skewed, clumped, and jittered, due to cable propagation delays through the network and ATM cell queueing (ATM cell transfer delays) and through many ATM switches in the network. Thus, the received data have to be reshaped at the receiving station to become a constant data stream as originally arranged.

One conventional method to reshape the data at the receiving station into the original constant rate stream is to transmit timing information to the ATM network along with each frame of the data.

Unfortunately, this method has following disadvantages:

(1) The data transmission is dependent on ATM network clock;
(2) The same network clock must be available at both sending and receiving ends; and
(3) The implementation is complicated.

Another conventional method to reshape the data at the receiving station into the original constant rate stream is to store the data received into a data queue. The receiving station then reads the queue with a local clock. The fill level of the queue is used to control the frequency of the local clock. The control is performed by continuously measuring the fill level around the queues midway point. By measuring the fill level a phase-locked loop can reconstruct the local clock. It the queue starts to fill up, the local clock reading the queue speeds up. If the queue starts to empty, the local clock slows down. If the ATM cell is lost in transit through the network, the receiver should detect the loss and put a null cell into the queue. Otherwise, the phase-locked loop reading the queue will become unstable.

While data transmission is independent from ATM network clock, this method has the following disadvantages:

(1) Data queue size is dependent on cell delay variation;
(2) If cells are lost in transit, null cells must be added to keep the local Phase Locked Loop (PLL) clock stable, thus this method may not be feasible for bursty LAN traffic; and
(3) Network jitter can affect playback of the bit stream (Playback refers to replaying the video and audio data (at a constant rate) to the user (i.e. video screen and sound speakers).

Therefore, it is desirable to provide improved apparatus and method to reshape the data at receiving station into a constant rate stream.

SUMMARY OF THE INVENTION

In one aspect, the present invention provides a network system including:

at least one sending terminal, connected to said network system, for sending a data stream containing a plurality of data segments being represented as: data segment (1), data segment (2), ..., and data segment (n), data segment (i) (i=1, 2, ..., n) being sent at a time $T_{send}$ (i) (i=1, 2, ..., n);

at least one receiving terminal, connected to said network system, for receiving said data stream including data segment (1), segment (2), ..., data segment (n), said data segment (i) (i=1, 2, ..., n) being received at time $T_{destination}$ (i);

means, at the endpoint of said receiving terminal, for measuring the time delay $T_{delay}$ (i) between $T_{send}$ (i) and $T_{destination}$ (i), (i=1, 2, ..., n);

means for generating a constant offset bias, said constant offset bias being greater than $T_{delay}$ (i) (i=1, 2, ..., n); and means for outputting said data segment (i) (i=1, 2, ..., n) at the time of $T_{send}$ (i) plus said constant offset bias.

In another aspect, the present invention provides a method to operate a network system. The method includes the steps of:

at transmitting end of a sending terminal connected to said network system, sending a data stream containing a plurality of data segments being represented as: data segment (1), data segment (2), ..., and data segment (n), data segment (i) (i=1, 2, ..., n) being sent at time $T_{send}$ (i) (i=1, 2, ..., n);

at receiving end of a receiving terminal, connected to said network system, receiving said data stream including data segment (1), segment (2), ..., data segment (n), said data segment (i) (i=1, 2, ..., n) being received at time $T_{destination}$ (i);

at the endpoint of said receiving terminal, measuring the time delay $T_{delay}$ (i) between $T_{send}$ (i) and $T_{destination}$ (i), (i=1, 2, ..., n);

generating a constant offset bias, said constant offset bias being greater than $T_{delay}$ (i) (i=1, 2, ..., n); and outputting said data segment (i) (i=1, 2, ..., n) at the time of $T_{send}$ (i) plus said constant offset bias.

Accordingly, one objective of the present invention is to provide an accurate universal timing information to each end system to keep each system's Real time Clock synchronized with the universal timing information.

Another objective of the present invention is to reshape the data stream at receiving points using the universal timing information.

Still another objective of the present invention is to reshape the data stream at receiving points in a network system where a common reference clock is not available from the network system (such as Plesiochronous Network Operation).

Still another objective of the present invention is to effectively reshape the data stream being transmitted in the environments including: (1) wireless and mobile vehicle multimedia, (2) video servers, and (3) video conferencing.

One feature of the present invention is that the endpoints of a network do not have to be synchronous with the network.

Another feature of the present invention is that precise data transfer delay through the entire network system can be calculated.

Still another feature of the present invention is that data transfer delay statistics can be recorded to monitor network performance.

Still another feature of the present invention is the capability to provide universal timing information to other network elements, in addition to endpoints.

Still another feature of the present invention is that clock recovery methods for data traffic are significantly simplified.

BRIEF DESCRIPTION OF THE DRAWING

Additional features and advantages of the present invention will become apparent to those skilled in the art to which this invention relates from the subsequent description of the preferred embodiments and appended claims, taken in conjunction with the accompanying drawings, in which:

FIG. 2B depicts an ATM network, where a GPS receiver is integrated to an ATM switch, in accordance with the present invention;

FIGS. 3A–3C depict data stream at the times: before being transmitted; after being received, but before being reshaped; and after being reshaped in accordance with the present invention;

DETAILED DESCRIPTION OF THE PREFERRED EMBODIMENT

The present invention creatively reshapes isochronous data by synchronizing the clock at each end station using Global Positioning System satellites. Thus, before describing the present invention in detail, it is helpful to introduce some basics about Global Position System.

Global Positioning System (GPS) satellites are traditionally used for air, land, marine, and space navigation. GPS is also used for geodesic and hydrographic surveying and exploration. One secondary benefit from GPS is the availability of a precise clock, since high precision clocks are required for precision navigation. Each GPS satellite contains two cesium and two rubidium clocks, providing a real time clock that is accurate to within 100 nsec (available to the general public). Limited access service with GPS satellites (for authorized users) can provide a real time clock that is accurate to within 15 nsec.

GPS signals have two transmission frequencies: (1) $L_1$ signal with 1575.42 Mhz, and (2) $L_2$ signal with 1227.6 Mhz. Navigating, timing, and telemetry data is modulated on Precision codes and Coarse Acquisition codes (P and C/A codes) and is transmitted in data frames by each satellite at 50 bits per second (bps).

Figure 1:
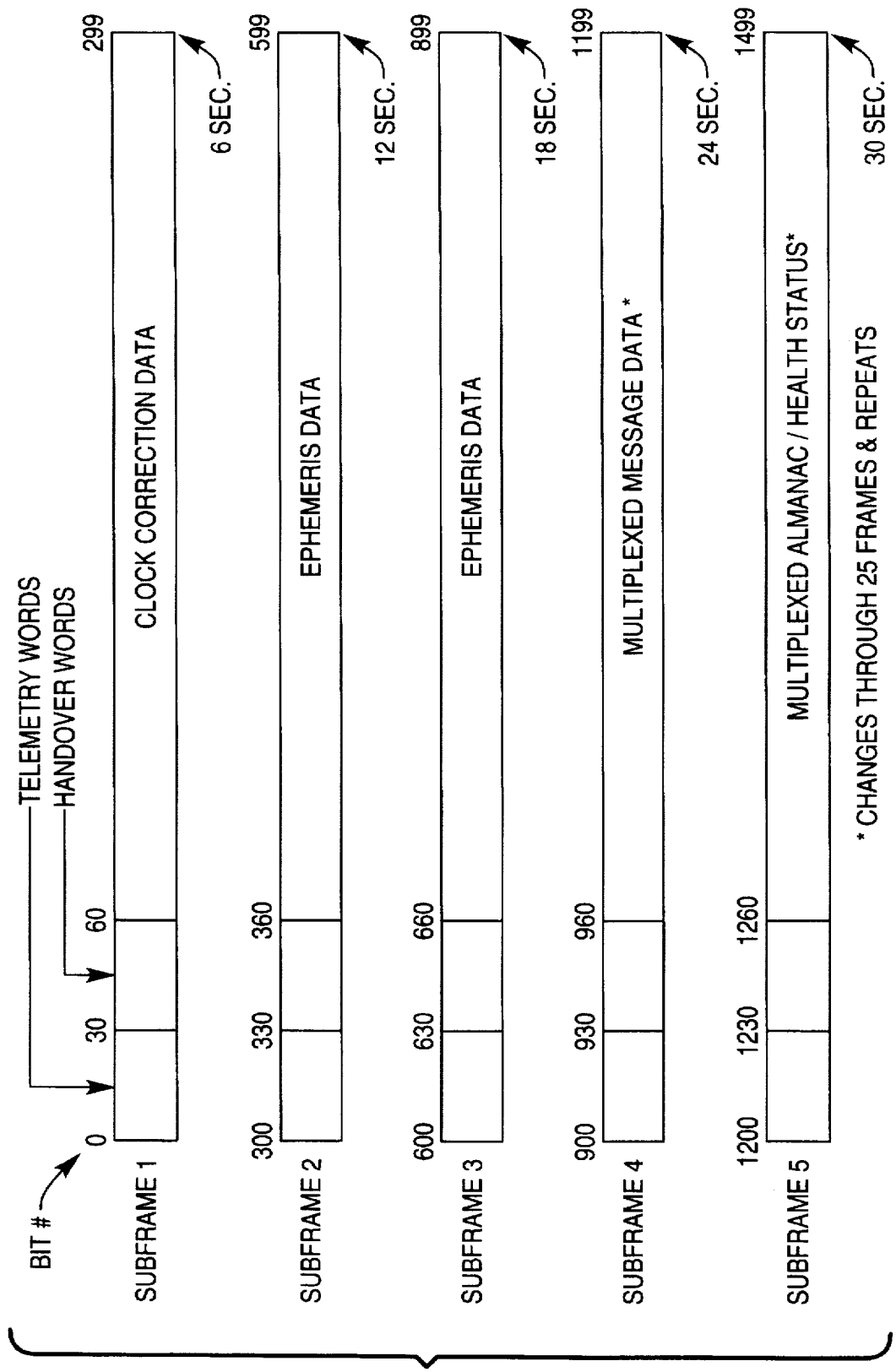
FIG. 1 depicts a GPS navigation message frame consisting of five 300-bit subframes.

FIG. 1 depicts a GPS navigation message frame consisting of five 300-bit subframes. The first subframe contains clock correction data and other parameters. A GPS Receiver uses the Clock Correction Data in subframe 1 to maintain an accurate and synchronized Greenwich Mean Time clock (internal to the GPS Receiver).

Twenty four GPS satellites currently orbit the earth at 12 hour intervals. The satellites are equally spaced in six orbital planes so that a minimum of four satellites are always in view by a user. Usually six to ten satellites are available to the user. Each satellite transmits at the same two radio frequencies, but with unique time and waveform patterns. Each satellite constantly transmits messages, which include the satellites' ephemeris (spherical position coordinates) and time information.

A GPS receiver will selects four or more available satellites and record the information that was transmitted by each satellite. Using the recorded information and vector algebra, the GPS receiver can determine its own current time (Greenwich Mean Time) and position.

Each GPS satellite Ground Monitor Station can concurrently track up to 12 satellites' $L_1$ and $L_2$ signals. The Monitor Station performs accurate ranging measurements with each satellite. Temperature, humidity, and barometric pressure measurements are also taken. Each Monitor Station has an accurate clock available so that each measurement can be timestamped. Each measurement is then transferred to a GPS Master Control Station.

The GPS Master Control Station collects and interprets the data sent by GPS Monitor Stations. The Master Control Station also generates test and calibration signals for each satellite. Periodically, each satellite gets uploaded with unique Navigation Messages, including new satellite ephemeris coordinates and clock bias correction factors. The GPS Master Control Station will also send messages to each satellite for orbit correction and clock frequency correction.

Figure 2A:
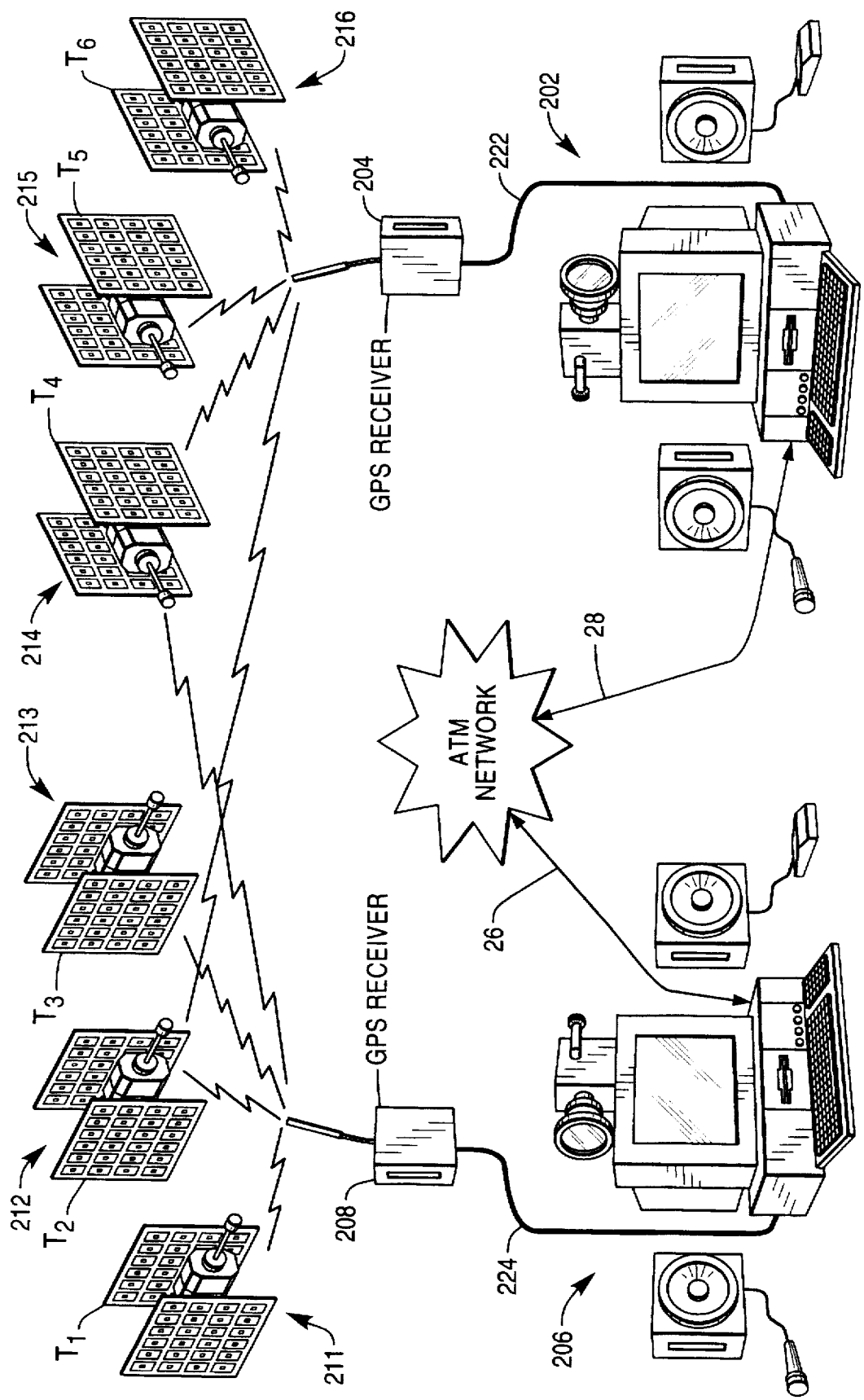
FIG. 2A depicts an ATM network, where a GPS receiver is integrated into each of the multimedia stations (A and B) on the network, in accordance with the present invention.

FIG. 2A depicts a network system, where a GPS receiver is integrated into each of the multimedia stations (A and B), in accordance with one embodiment of the present invention. The network system includes six GPS satellites (211, 212, 213, 214, 215, 216), two GPS receivers (204, 208), two multimedia workstations (202, 206), and an ATM network.

Satellite 211 broadcasts (transmits) its current time (T1) and position, satellite 212 broadcasts its current time (T2) and position, and so on.

Referring to FIGS. 3A–3C, there are shown a data stream at three different times in accordance with the present invention. In FIGS. 3A–3C, the vertical bars are Payload Data Units (PDUs) within a data frame. FIG. 3A shows the PDUs being transmitted to the ATM network by a sending station. Figure B shows the PDUs after being received by a receiving station, but before being reshaped at the receiving station. Figure C shows the PDUs after being reshaped at the receiving station.

Reference is now made to FIGS. 2A and 3A–3C. While both workstations A and B can act as either sending or receiving station, for the sake of discussion it is assumed that workstation A will transmit data frames to workstation B via the ATM network. When multimedia workstation A has isochronous video or audio data as shown in FIG. 3A to send to a destination station (workstation B in this case), the transmit components installed with station A take a snapshot (T) of its Real Time Clock. This snapshot is the Universal Time Clock (UTC) stamp, which is transmitted to the ATM network along with the video and audio data. The UTC is synonymous with Greenwich Mean Time (Universal Coordinated Time).

ATM cells arrive at workstation B at time $(T+\Delta t=T_{dest})$, as shown in FIG. 3B. T and $T_{dest}$ are known, since they are supplied by each workstation's Real Time Clock (synchronized by the GPS receiver). As will be discussed, ATM Layer Processors 502 and 604 (shown in FIGS. 5 and 6) read Greenwich Mean Time clock from the GPS Receiver (shown in FIG. 4) and write the clock to the Real Time Clock.

In passing through the ATM network, the ATM cells become skewed, clumped, and jittered as shown in FIG. 3B, hence $\Delta t$ is different for each cell that arrives. $\Delta t$ can be several hundred milliseconds (msec) and is dependent upon the size of the ATM network, cable propagation delays, and cell transfer delays through ATM switches in the network.

Note that an accurate cell transfer delay through the entire ATM network can be calculated by the destination workstation (workstation B in this case):

$$\Delta t = T_{dest} - T.$$

It should be noted that this is an advantage of using GPS at each end station.

The receiving workstation (workstation B in this case) can use a Constant Offset Bias ($\Delta \tau$) to reshape the isochronous data back into the original constant rate stream. This is a unique feature of the present invention.

In the present invention, $\Delta \tau$ is be selected to be always greater than the maximum $\Delta t$, so that the video or audio data can be transferred to the user at a steady stream without any gaps in the data.

The receiving workstation transfers each received PDU to its video and/or audio processors at time $(T+\Delta \tau)$, so that the received PDUs are reshaped as constant data stream as originally transmitted.

FIG. 2B depicts a network system, where a GPS receiver is integrated into an ATM switch, in accordance with another embodiment of the present invention.

The network system includes three GPS satellites (251, 252, 253, . . . ), GPS receiver 255, two multimedia workstations (262, 264), customer premises ATM switch 254 and an ATM network.

Satellite 251 broadcasts (transmits) its current time (T1) and position, satellite 252 broadcasts its current time (T2) and position, and so on.

Workstations 262 and 264 can communicate with each other via ATM switch 264 and the ATM network.

Since a GPS receiver chipset is relatively expensive, as much as $200-$300 at the present time, it can be costly to directly connect a GPS receiver to each multimedia workstation.

A more cost effective solution can be to integrate GPS receiver 255 into customer premises ATM Switch 254 or a Network Management Station (NMS).

Here, a management agent in ATM switch 254 can access GPS receiver's timestamp and periodically broadcast the timestamp to each multimedia workstation (via a high priority OAM (Operations And Maintenance) cell). Here, a small $\Delta t$ have to be added to the timestamp at the workstation to account for the cell transfer delay from the switch to the workstation.

In the configuration shown in FIG. 2B, ATM Switch 254 or NMS maintains the GPS Universal Time clock. Periodically, this clock is sampled and the clock sample is broadcast to each multimedia workstations ATM Layer Processor (see 502 in FIG. 5 and 604 in FIG. 6). The ATM Layer Processor then updates its own Real Time Clock. The Constant Offset Bias, $\Delta \tau$, can still be maintained by each individual workstation.

Figure 4:
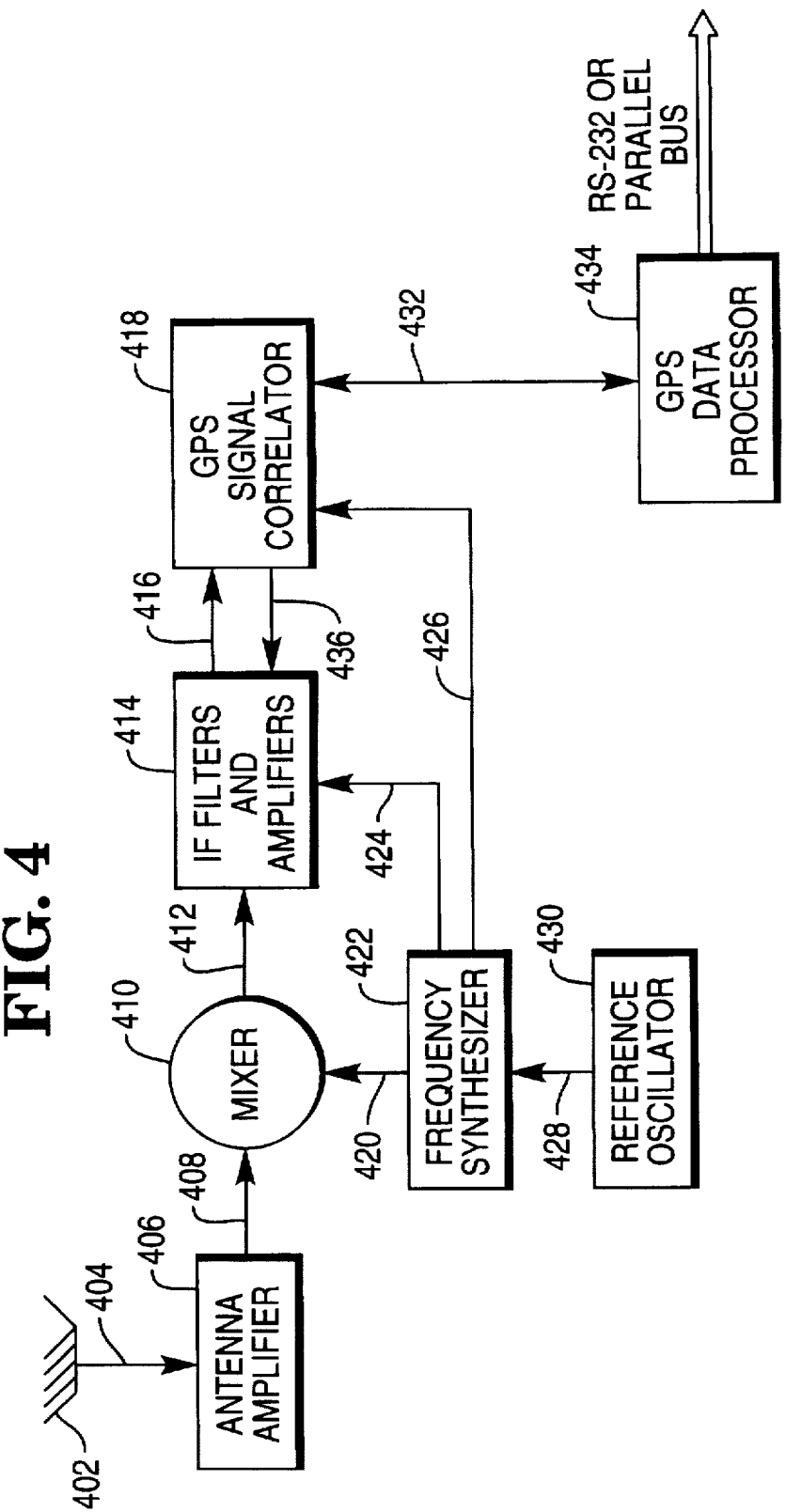
FIG. 4 depicts the block diagram of a typical GPS receiver.

FIG. 4 depicts the block diagram of GPS receivers 208, 204 and 255 shown in FIGS. 2A and 2B in greater detail.

The GPS receiver includes antenna 402, mixer 410, IF filters and amplifiers 414, GPS signal correlator 418, frequency synthesizer 422, reference oscillator 430 and GAS data processor 434.

GPS antenna 402 is exposed to a wide range of transmission frequencies. To achieve accurate tuning of such a narrow band, the final filtering stage is kept at a constant Intermediate Frequency (IF). Thus, in order to extract the desired GPS frequency, IF filters and amplifiers 414 are used. For GPS $L_1$ signals, a spread spectrum bandwidth of 2 MHz is desired. The received antenna RF signal is converted down, via mixer 410, to the desired local IF signal.

GPS Signal Correlator 418 provides the appropriate Precision and Coarse Acquisition (P and C/A) codes to demodulate and extract the navigation, timing, and telemetry data at 50 bits per second (bps).

GPS Data Processor 434 is responsible for recording and interpreting the GPS data and keeping the GPS Signal Correlator in phase with the received satellite signal. It is also responsible for maintaining the Universal Time Clock (Greenwich Mean Time) and taking into account signal propagation delays caused by antenna cable length and propagation delays from the satellite to the antenna.

The GPS Receiver (via the GPS Data Processor 434 shown in FIG. 4) maintains an accurate and synchronized Greenwich Mean Time clock internal to the GPS Receiver. This clock is periodically read by the ATM Layer Processors 502 and 604 shown in FIGS. 5 and 6.

Figure 5:
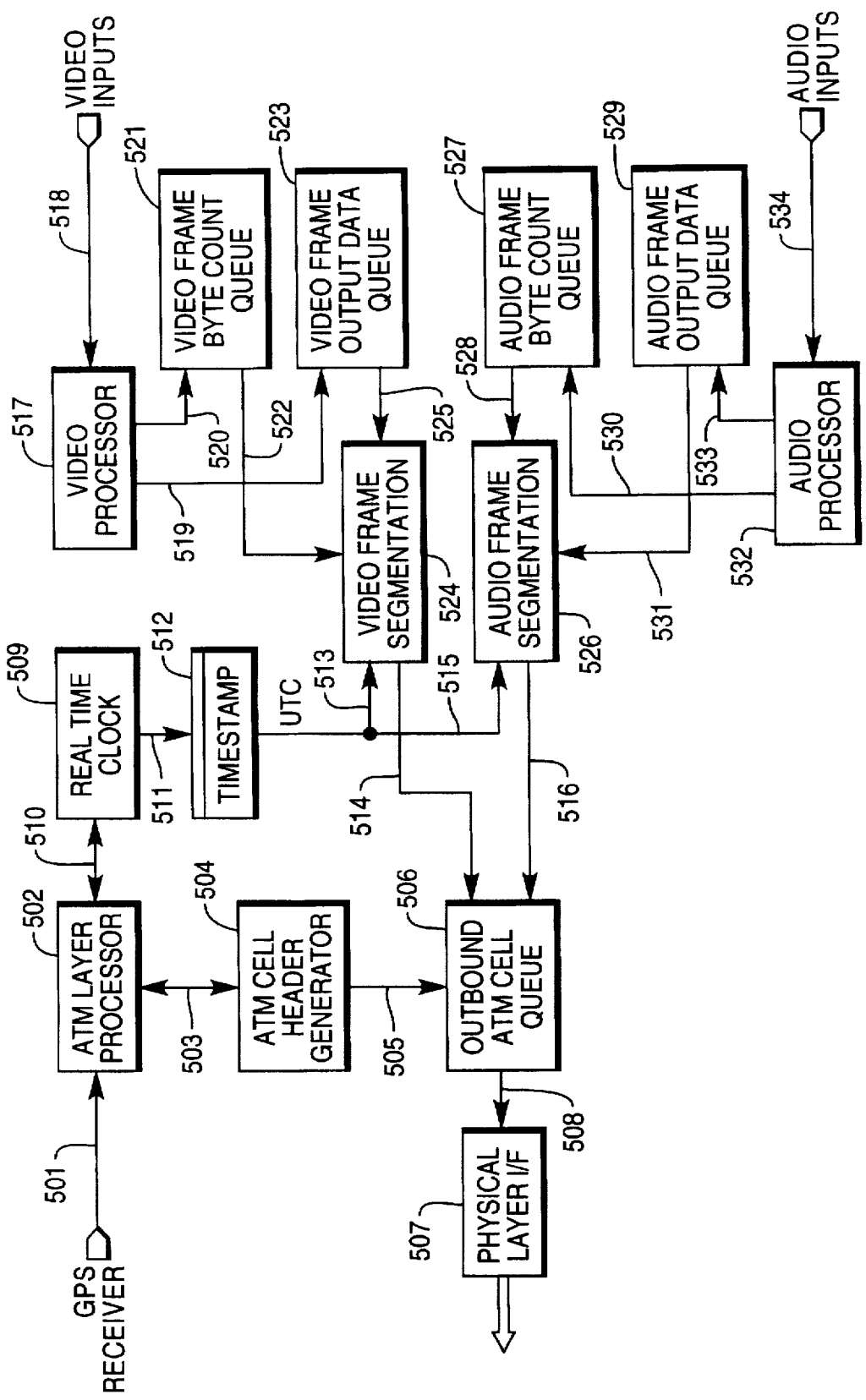
FIG. 5 depicts block diagram showing ATM layer transit components, in accordance with the present invention.

FIG. 5 depicts block diagram showing ATM layer transit components, which are installed within workstations 202 and 206 shown in FIG. 2A, or installed in workstations 262 and 264 shown in FIG. 2B.

ATM Layer Processor 502, coupled to GPS receiver, is responsible for refreshing the Real Time Clock 509 from the GPS Receiver. Refreshing is necessary because crystal oscillators are not as accurate as rubidium or cesium oscillators and tend to drift more over time. Hence, a systems Real Time Clock will drift over time as well. Typically, a crystal oscillator will cause the systems Real Time Clock to drift by more than 100 μsec per day. This means that the Real Time Clock requires frequent calibration. GPS provides a method to recalibrate the systems Real Time Clock. A GPS receiver can provide an accurate ubiquitous timestamp and each system can refresh its Real Time Clock using the GPS timestamp.

ATM layer processor 502 also generates ATM Cell Headers for transmission of video and audio frames that have been segmented.

A Payload Data Unit (PDU) is comprised of 1 video or audio frame and a snapshot of the Real Time Clock. The PDU is then split up into 48 byte fixed length chunks (ATM cells to be transmitted into the network). This is called Frame Segmentation, which is performed by both Video Frame Segmentation and Audio Frame Segmentation. An ATM Cell is a fixed length, 53 byte packet. The ATM cell is comprised of a 5 byte header (contains routing and other information) and 48 bytes of user data. Once the Video and Audio frame is segmented, the ATM Cells are stored in the Outbound ATM Cell Queue until they get transmitted to the network. The Physical Layer Interface (I/F) provides the necessary circuitry to interface with whatever physical media is connected to the ATM Network.

Video Processor 517 and Audio Processor 532 are responsible for capturing video and audio data. The video and audio data is usually compressed by the Video and Audio Processors in order to minimize the amount of data that gets sent to the network.

When a complete video frame is written into Video Frame Output Data Queue 523, the frames' Byte Count is written into Video Frame Byte Count Queue 521 by Video Processor 517. Timestamp register 512 is latched and is used by Video Frame Segmentation 524 as the Universal Time Clock (UTC) stamp, which is transmitted along with the segmented video frame.

Figure 6:
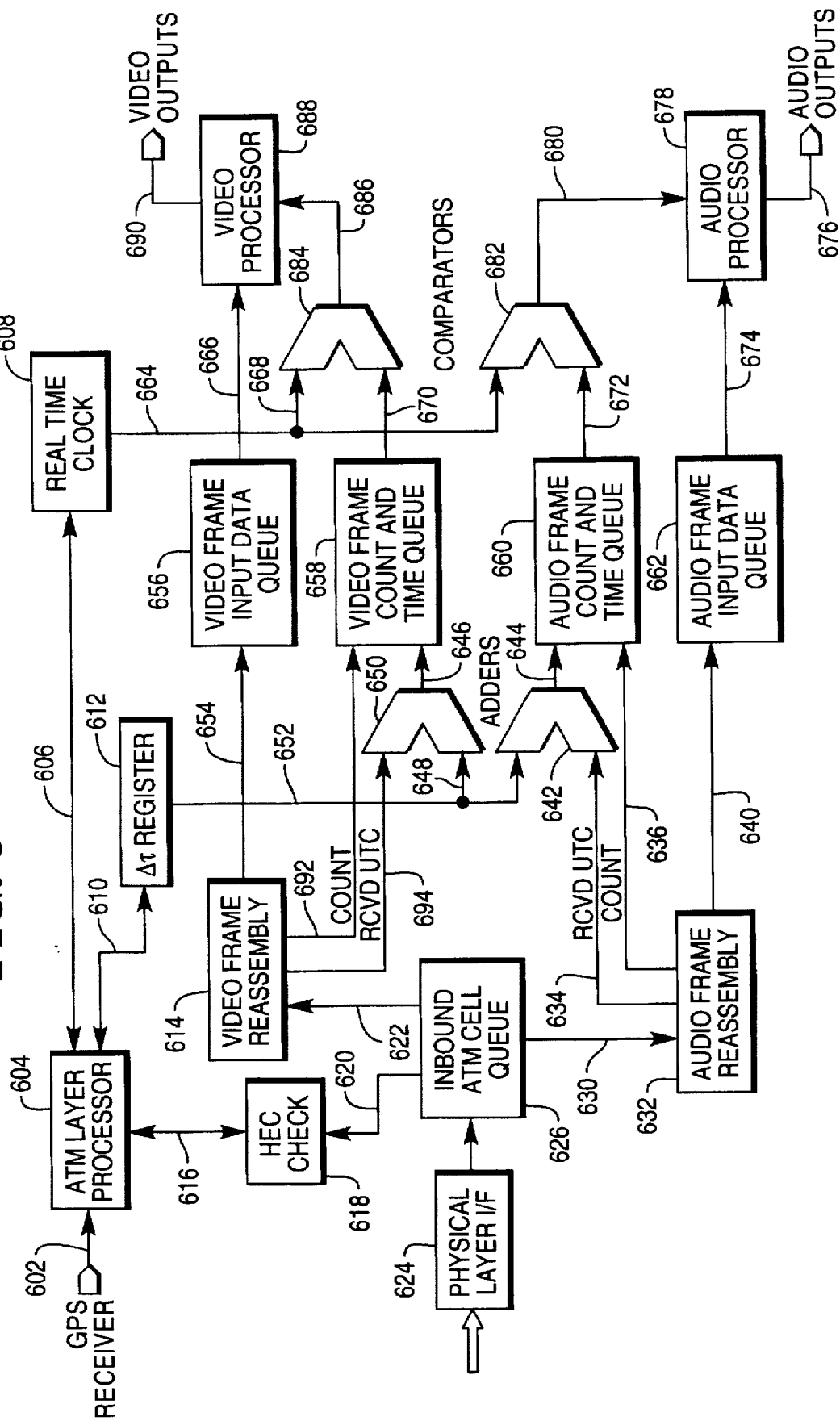
FIG. 6 depicts block diagram showing ATM layer receive components, in accordance with the present invention.

FIG. 6 depicts block diagram showing ATM layer receive components, which are installed within workstations 202 and 206 shown in FIG. 2A, or installed in workstations 262 and 264 shown in FIG. 2B.

Video Processor 688 and Audio Processor 678 are responsible for replaying the video and audio data at their original constant rate. The Video and Audio Processors also decompress the received video and audio frames in order to restore the data back into its original form.

Physical Layer Interface (I/F) 624 provides the necessary circuitry to interface with whatever physical media is connected to the ATM Network.

An ATM Cell is a, 53 byte "fixed length" packet. The ATM cell is comprised of a 5 byte header (contains routing and error checking information) and 48 bytes of user data. ATM cells are received from the network and stored in the Inbound ATM Cell Queue. The ATM Layer Processor will strip the 5 byte header from the ATM Cell. The routing information in the header will define whether the data is for the video processor or for the audio processor (Virtual Path Identifier (VPI) and Virtual Channel Identifier (VCI) fields). ATM cell header error checking is performed by Header Error Code Check (HEC Check).

A Payload Data Unit (PDU) is comprised of 1 video or audio frame and a snapshot of the Real Time Clock. The PDU is constructed from the 48 byte fixed length chunks (ATM cells received from the network and stored in Inbound ATM Cell Queue 626). This is called Frame Reassembly, which is performed by both Video Frame Reassembly 614 and Audio Frame Reassembly 632. Once the Video and Audio frame is reassembled, the time information (Received Timestamp or Rcvd UTC) is stripped off of the PDU. The video and audio frames are stored in Video Frame Input Data Queue 656 or Audio Frame Input Data Queue 662 until they get processed by Video Processor 688 or Audio Processor 678.

ATM Layer Processor 604 is again responsible for refreshing Real Time Clock 608 from the GPS Receiver. It also extracts and verifies the received ATM Cell Headers for video and audio frames that are to be reassembled. By looking at the VPI/VCI fields in the ATM Cell Header, the ATM Layer Processor can route the cells to either the Video or Audio Frame Reassembly logic. The ATM Layer Processor is also responsible for initializing and maintaining $\Delta\tau$ Register 612, which provides the Constant Offset Bias for reshaping the video and audio data.

Video Frame Reassembly 614 extracts the Byte Count and UTC from the received video frame Segmentation And Reassembly PDU (SAR PDU). The raw video data is written into Video Frame Input Data Queue 656. The Received UTC is added to $\Delta\tau$. The frame Byte Count, along with (Rcvd__UTC+$\Delta\tau$) is written into Video Frame Count and Time Queue 658. Rcvd_UTC stands for Received Universal Time Clock stamp.

The video frame at the front of Video Frame Count and Time Queue 658 compares its (Rcvd__UTC+$\Delta\tau$) with the Real Time Clock 608. Video Processor 688 is notified when the two are equal, at which time the video data is extracted from Video Frame Input Data Queue 656 and displayed on the video screen (or audio speakers).

$\Delta\tau$ can be separated into two registers for both video and audio processing in order to facilitate program synchronization (i.e. correct lip synchronization).

$\Delta\tau$ can be modified or updated by ATM Layer Processor 604 in order to facilitate pause, playback, reverse, or fast forward functions.

Figure 7:
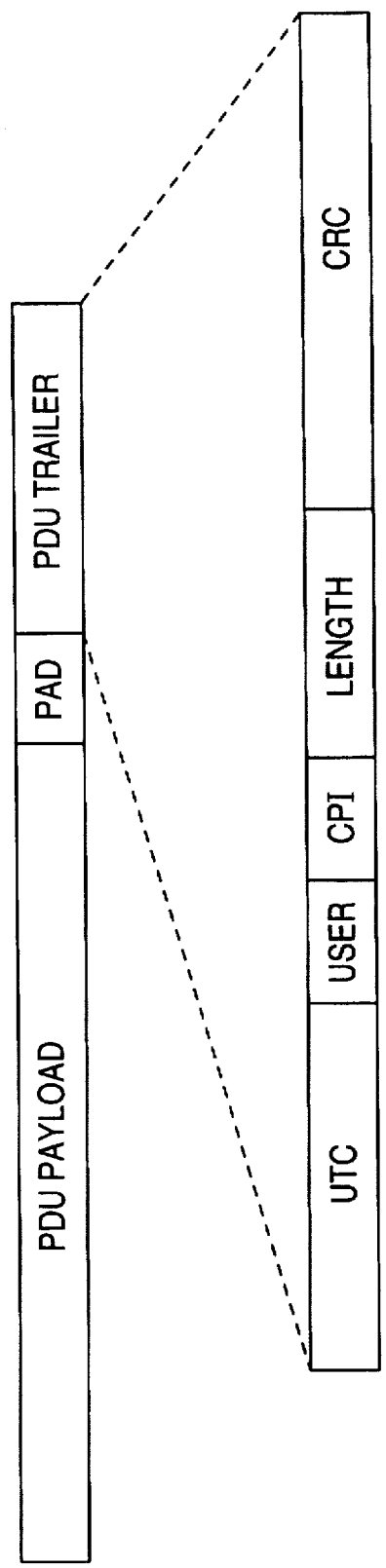
FIG. 7 depicts one possible ATM Adaptation Layer type 5 Payload Data Unit (AAL5 PDU) frame, in accordance with the present invention.

FIG. 7 depicts one possible ATM Adaptation Layer Type 5 format (AAL5) of a Payload Data Unit (PDU) frame format used at ATM adaptation layer, in accordance with the present invention.

In FIG. 7, PDU Payload is a user data filled (1 to 65k bytes long); Pad contains padding bytes (0–37 bytes long); UTC stands for Universal Time Clock Stamp (3 bytes long) in accordance with the implementation of the present invention; CPI stands for Common Part Indicator; Length indicates the length of Payload field, and CRC stands for 32 bit CRC Checksum (4 bytes).

AAL5 is rapidly gaining acceptance for Video-On-Demand applications at ATM adaptation layer. It is used to transmit Constant Bit Rate (CBR) MPEG-2 video, audio, and data.

The AAL5 PDU frame format shown in FIG. 7 is the same as that defined in ITU-T Recommendation I.363, with the addition of the 3 byte UTC field. The UTC field is attached by Video Frame Segmentation 524 and Audio Frame Segmentation 526 shown in FIG. 5, and removed by Video Frame Reassembly 614 and Audio Frame Reassembly 632. This field is the Universal Time Clock stamp, which is transmitted along with the video and audio data frames.

If the systems Real Time Clock has a 1 microsecond granularity (incremented every 1 µsec), then a 3 byte field can hold a value up to 16.78 seconds. This should be much greater than the cell transfer delay experienced through any ATM network.

At the present time, there are primarily two methods to reshape isochronous data at the receiving points, namely, Synchronous Residual Time Stamp (SRTS) method and Adaptive Clock Method. In the following comparison, the advantages of the present invention over these two methods will be better appreciated.

Figure 8:
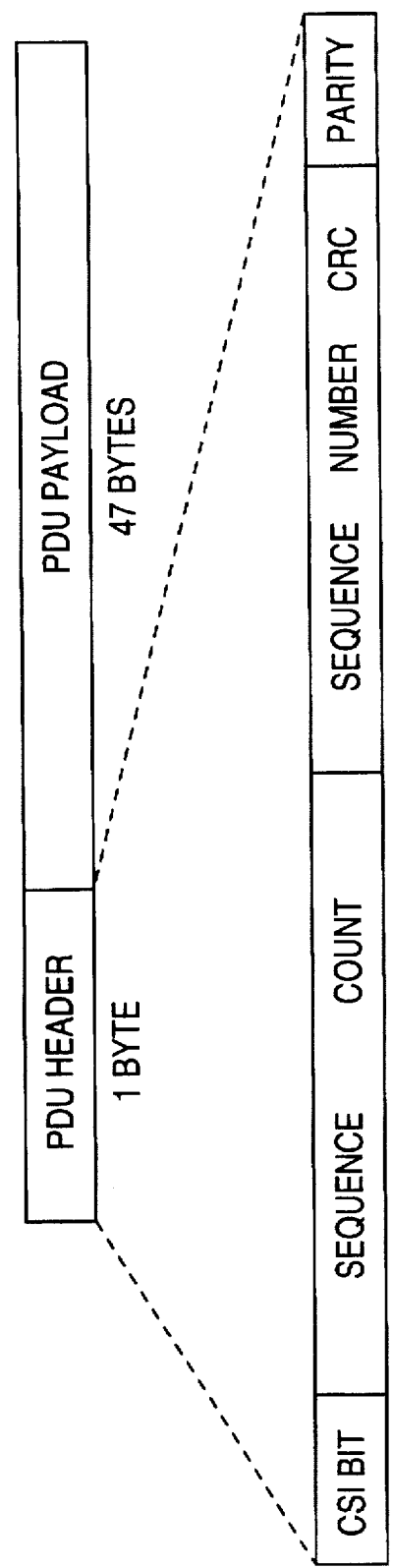
FIG. 8 depicts a AAL1 PDU format adaptable to SRTS method.

FIG. 8 depicts an AAL1 PDU format adaptable to SRTS method. This format complies with ITU-T Recommendation I.363. In FIG. 8, PDU Header conveys ATM Adaptation Layer information to the destination endpoint (1 byte); PDU stands for Payload Data Unit and is a user data field (47 bytes); CSI stands for Convergence Sublayer Indication (1 bit); Sequence Count indicates the ATM cells number (position) in a sequence of eight ATM Cells (3 bits); Sequence Number CRC indicates a 3 bit CRC Checksum of the Sequence Count field (3 bits); and Parity is even parity over PDU Header (1 bit).

Figure 9:
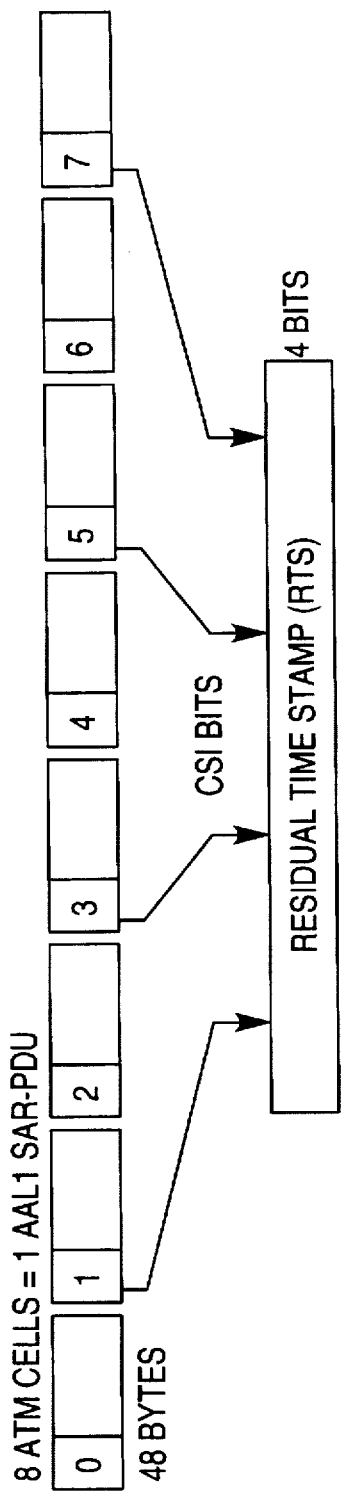
FIG. 9 shows a method of source clock frequency recovery using the SRTS method and AAL1, which complies with ITU-T Recommendation I.363.

FIG. 9 shows a method of source clock frequency recovery using the SRTS method, in which eight ATM cells (0–7) are combined as an ATM Adaptation Layer Type 1 format Payload Data Unit (AAL1 SAR-PDU). Each of the eight ATM cells has the format as shown in FIG. 8. The four CSI bits in the "odd numbered" ATM cells (1, 3, 5, 7) are combined as a 4 bit Residual Time Stamp (RTS). The format as shown in FIG. 9 complies with ITU-T Recommendation I.363.

The Synchronous Residual Time Stamp (SRTS) method uses the Residual Time Stamp (RTS) to measure and convey information about the frequency difference between a common reference clock derived from the ATM network and the local clock. The same network clock is assumed to be available at both the transmitter and the receiver.

The 4 bit RTS is transmitted in the serial bit stream by using the CSI bit from eight "odd" successive AAL1 PDU Headers (ATM Cells). The 4 CSI bits from the eight "even" successive AAL1 PDU Headers are available for other uses. The Sequence Count field in the AAL1 PDU Headers determine whether a PDU is "odd numbered" or "even numbered".

Using the received RTS and the common network clock, the receiver can produce a reference timing signal for a phase-locked loop in order to reconstruct the local clock.

Unfortunately, SRTS method has the following disadvantages:

(1) The bit stream is dependent on network clock;
(2) The same network clock must be available at both sending and receiving ends, because two endpoints can be located thousands of miles from each other, and each endpoint might be using different ATM network media that may not be clock compatible;
(3) RTS is the approximately measured difference between the network clock (e.g. 155.520 Mhz) and local clock frequency (The local clock is internal to the endpoint and is usually some multiple of the frequency at which the endpoint displays the video data on the screen or plays the audio data on the speakers); and
(4) RTS is used at the receiving end as a reference timing signal for a phase-locked loop to reconstruct the local clock.

Comparing with RTS method, the present invention has the following advantages:

(1) GPS is not dependent on network clocks;
(2) Receiving ends do not have to be synchronous with the ATM network;
(3) Different network clocks can be used at sending end and receiving end; and
(4) No phase-locked loop is required to reconstruct the local lock.

Figure 10:
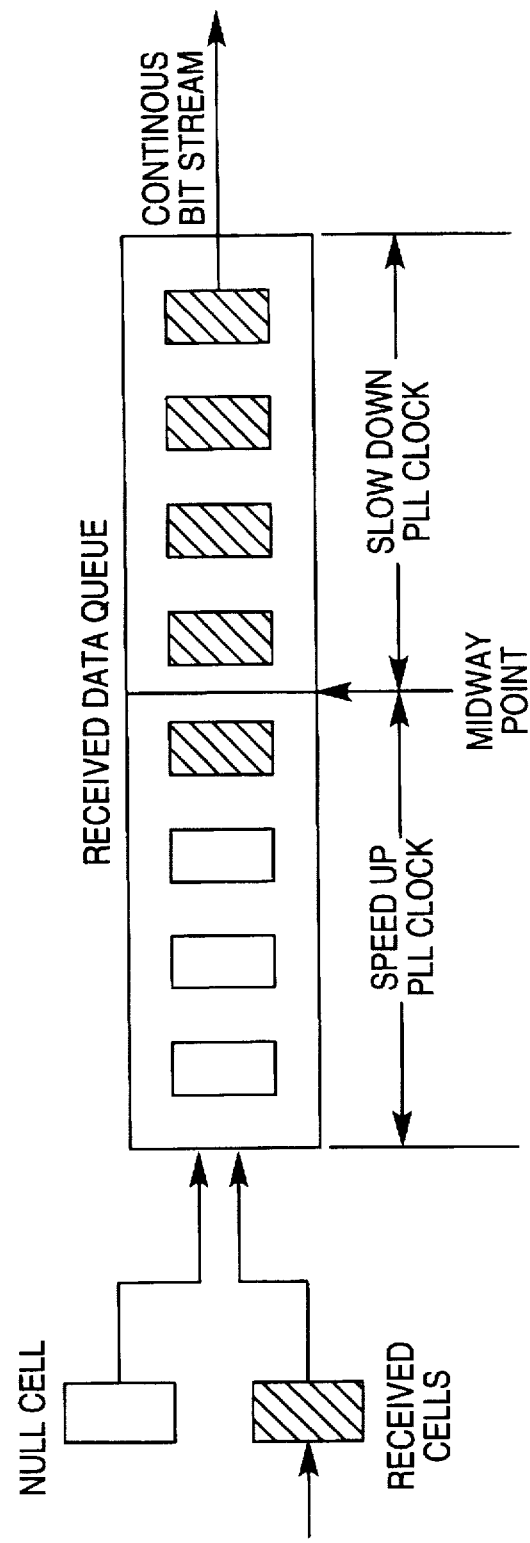
FIG. 10 shows a method of source clock frequency recovery using the Adaptive Clock method, which complies with ITU-T Recommendation I.363.

FIG. 10 shows a method of source clock frequency recovery using the Adaptive Clock method, which complies with ITU-T Recommendation I.363.

At the receiver, the data from the network is stored into the Received Data Queue. The receiver then reads the queue with a local clock. The fill level of the queue is used to control the frequency of the local clock. The control is performed by continuously measuring the fill level of the queues midway point. By measuring the fill level, a phase-locked loop can reconstruct the local clock. If the queue starts to fill up, the local clock reading the queue speeds up. If the queue starts to empty, the local clock slows down.

If an ATM cell is lost in transit through the network, the receiver should detect the loss and put a null cell into the queue. Otherwise, the phase-locked loop reading the queue will become unstable. This also demonstrates that the Adaptive Clock method may work for CBR traffic, but may not be feasible for bursty LAN traffic.

While bit stream is independent from ATM network clock, Adaptive Clock method has the following disadvantages:

(1) Data queue size is dependent on cell delay variation;
(2) If cells are lost in transit, null cells must be added to keep the local Phase Locked Loop (PLL) clock stable; and
(3) Network jitter can affect playback of the bit stream (Playback refers to a process of displaying the original video or audio data to the video screen or audio speakers at the destination endpoint).

Comparing with Adaptive Clock method, the present invention has the following advantages:

(1) No phase-locked loop is required to reconstruct a local PLL clock;
(2) If cells are lost in transit, null cells do not need to be inserted into the bit stream;
(3) Buffer sizes can be minimized since receiving end does not have to maintain the buffers at half full; and
(4) Network jitter does not affect playback of the original bit stream.

One distinct feature of the present invention is that it can be used with Moving Picture Experts Group (MPEG) standards. MPEG adaptability is an important consideration in the present invention, because CD-ROMs (Compact Disks) are formatted using MPEG-1 standards. In addition, MPEG-2 Standards (Currently in review) define multimedia formats for compression, decompression, and transmission of video data, audio data, and user data over a network.

Figure 11:
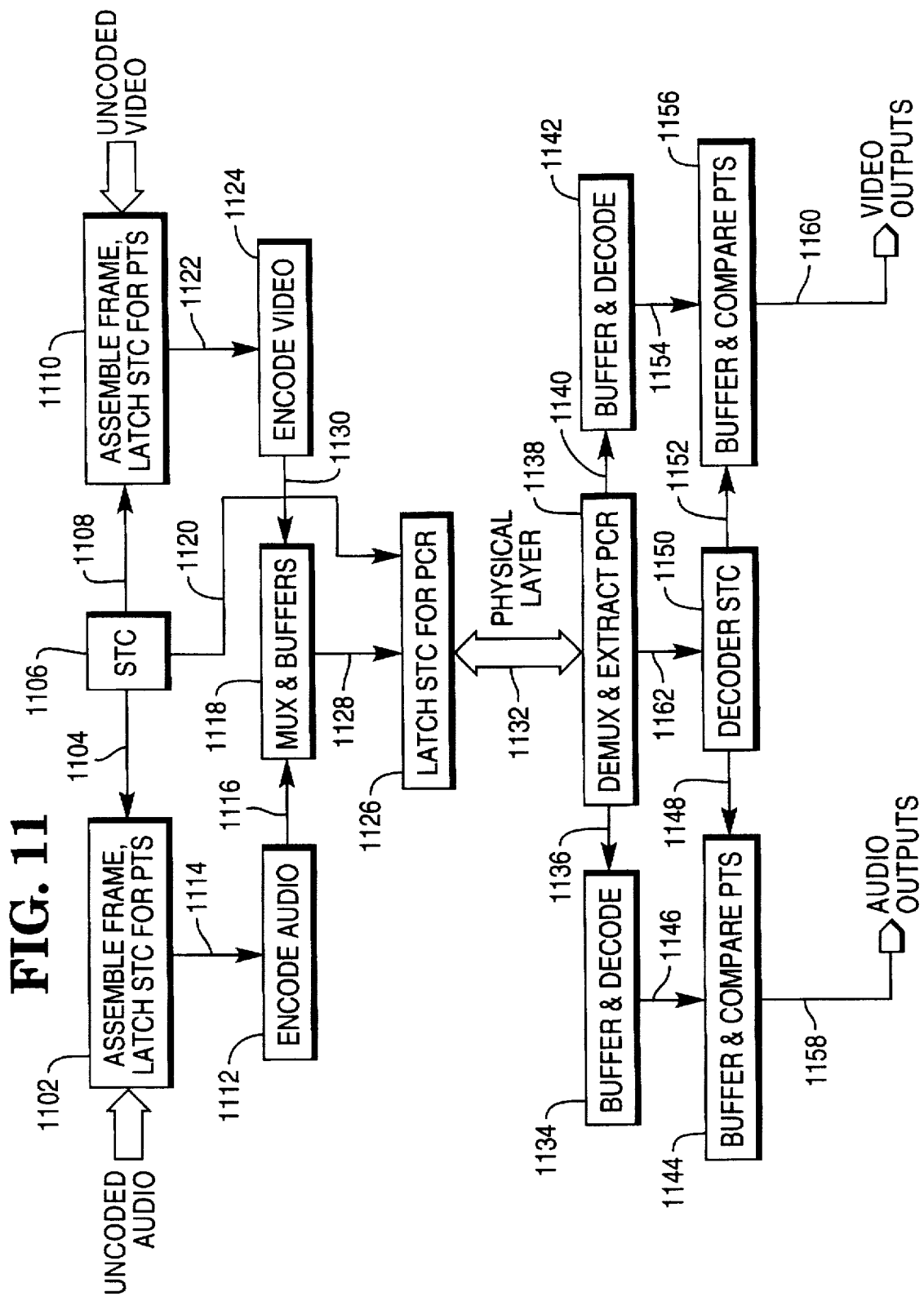
FIG. 11 shows a basic model of the systems part of MPEG standards.

FIG. 11 shows a basic model of the systems part of MPEG standards.

MPEG is a standards writing group, operating under the joint sponsorship of the International Standards Organization (ISO). MPEG standards are defined in 3 parts:

Part 1, Systems, defines formats for packetization, encapsulation, and transmission of video data, audio , data, and user data over a network.

Part 2, Video, defines algorithms for compression, decompression, and smoothing and predicting of video data.

Part 3, Audio, defines algorithms for compression and decompression of audio data.

MPEG has written two standards for compressed video and audio. MPEG-1 standards (completed in late 1991) are defined for error free digital storage environments, such as CD-ROMs. MPEG-2 standards (essentially completed in November of 1993) are defined for error prone environments, such as ATM Networks, etc.

FIG. 11 shows a simplified MPEG System model of a transmitter and receiver. In FIG. 11, PCR stands for Program Clock Reference; PTS stands for Presentation Time Stamp; and STC stands for System Time Clock.

At the sender, uncoded raw video (audio) data is received (such as a microphone and camera). The video (audio) data is compressed and then assembled into a video (audio) frame and the STC 1106 is sampled for use as a PTS at the receiver. The video (audio) frame is then segmented into packets for transmission to the physical layer. The video and audio packets are then multiplexed and buffered into a single stream of packets. The STC is periodically sampled for use as a PCR at the receiver. The video (audio) packets are then sent to the physical layer media, which could be a CD player, a digital recorder, an ATM Network, etc.

At the receiver, the video (audio) packets are received from the physical layer media. The video and audio packets are then separated from the single stream of packets and buffered. If a PCR is received, then the received PCR is extracted from the single stream and it is written to the receivers STC. The video and audio packets are then combined back into video (audio) frames. The PTS is extracted from the video (audio) frames. The video (audio) frames are then decompressed and then assembled back into the original data stream. The original data stream is displayed at the video (audio) outputs when the PTS is equal to the STC.

With MPEG, the STC at the receiver is updated from the STC of the sender. It must be periodically updated by the sender so that the video and audio data can be played at the original constant rate (using the PTS) without any picture or sound jitter.

MPEG standards define the data formats at the input to the decoder and how the decoder should interpret the data. MPEG standards do not define Physical Layer attributes, such as modulation and error correction schemes.

MPEG Systems standards provide two methods for multiplexing compressed video and audio and user data into a single compressed bit stream.

The Program Stream (PS), originally defined for MPEG-1 system (defined ISO/IEC 11172-1:1993(E)), is optimized for error free digital storage applications, such as CD-ROMs.

Figure 12:
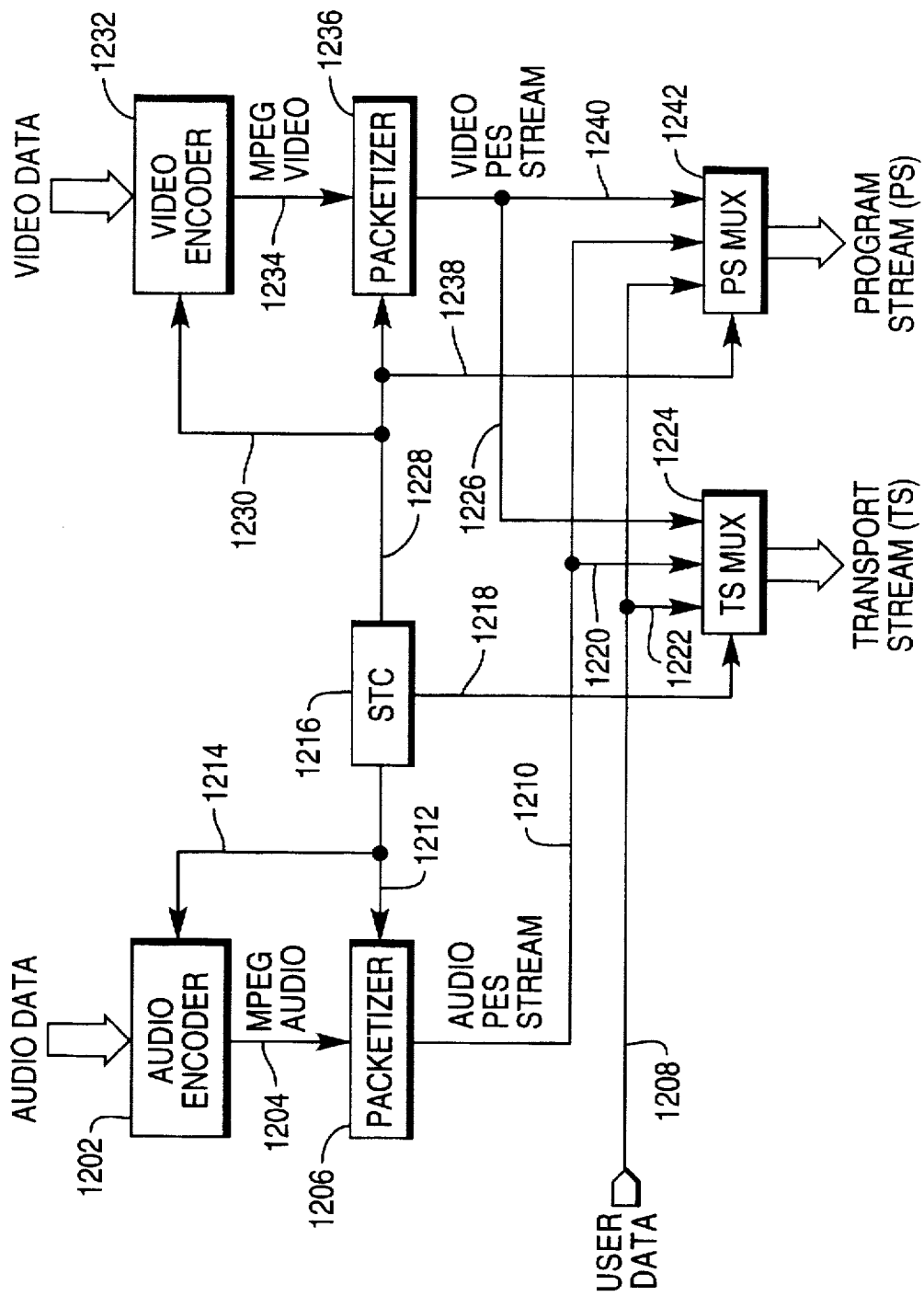
FIG. 12 shows MPEG-2 multiplexing schemes for MPEG-2 systems.

FIG. 12 shows MPEG-2 multiplexing scheme for MPEG-2 system (defined by ISO/IEC DIS 13818-1:6/30/1994), which defines a new Transport Stream (TS) for more error prone environments. Both of these streams are constructed from PES Packets. PES Packets are formed by packetizing the continuous data generated by an elementary stream encoder, such as video or audio compression logic.

In MPEG 2 system, as shown in FIG. 12, video, audio, or user data is embedded in a packetized elementary stream (PES). One or more PES packets can be assembled into either a Program Stream (PS) or Transport Stream (TS) (MPEG-2 only). The PS is used for error free environments where multiple PES packets are synchronized; whereas TS is used for error prone environment where multiple PES packets are unsynchronized.

The Program Stream strings PES Packets together along with "Control" Packets to form a single bit stream. A Control Packet contains PCR timing information—the sample of the senders STC. PES Packets are usually long, so the Program Stream is well suited for transmission in error free environments, e.g. compressed data stored on a compact disc. The PES Packet size is usually selected to match a common disk sector size (~2 kBytes).

The Transport Stream uses a fixed packet length of 188 bytes. The smaller packet size is more suited for hardware processing and error correction schemes. The Transport Stream is suitable for delivering compressed video and audio over error prone media, such as cable TV and public networks.

It should be noted that FIG. 11 shows a System Model for both MPEG-1 and MPEG-2, and FIG. 12 shows multiplexing schemes for both MPEG-1 (PS) and MPEG-2 (TS).

Figure 13:
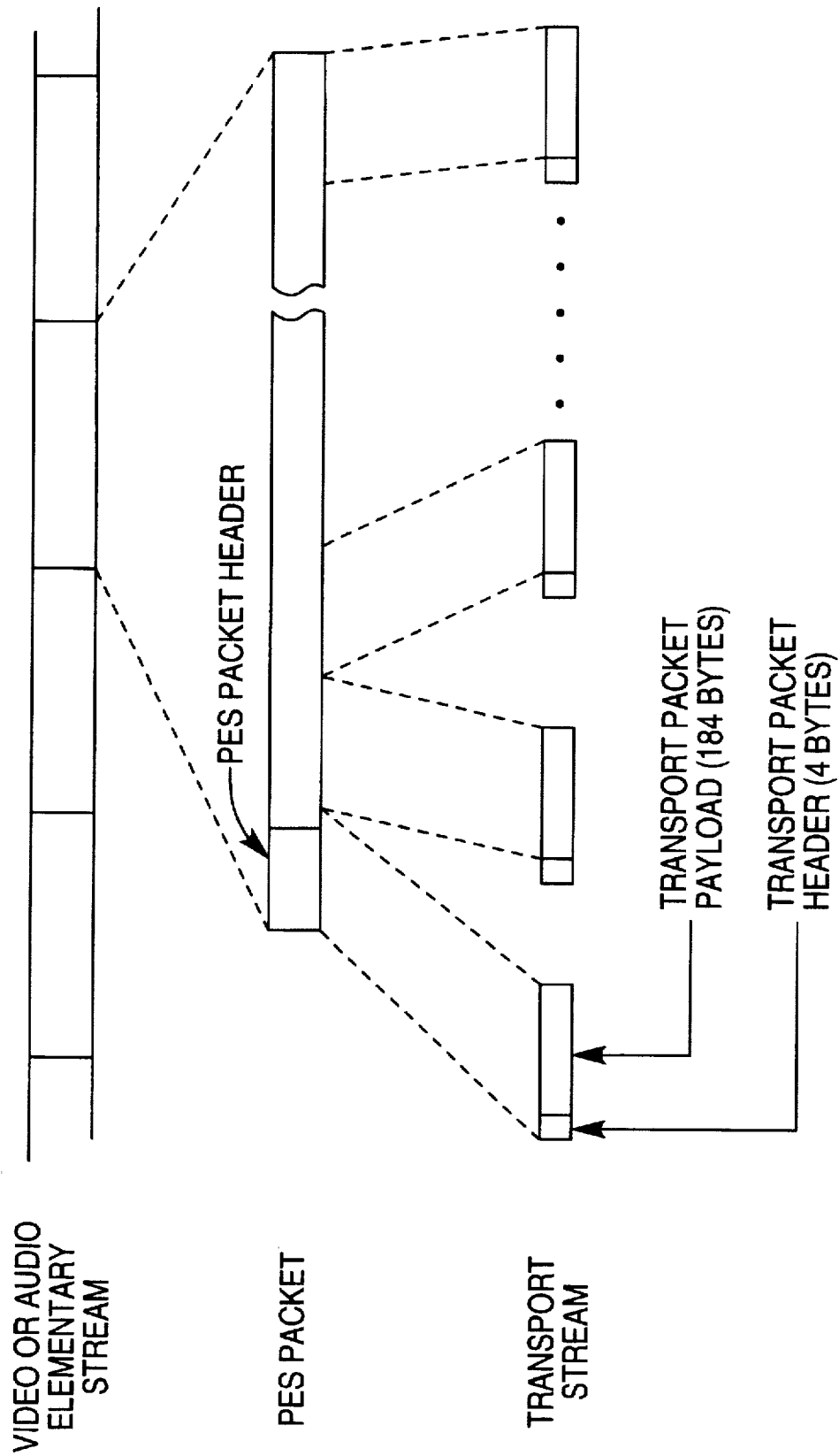
FIG. 13 illustrates the construction of an MPEG Transport Stream.

FIG. 13 illustrates the construction of a Transport Stream. In this particular illustration, only one elementary stream is shown, but many elementary streams could be shown transmitting Transport Packets, which are multiplexed into one Transport Stream. A Packet Identifier field in the Transport Packet Header defines which Elementary Stream each Transport Packet is for.

Since each PES has a unique Packet Id, an MPEG decoder can quickly and easily find the desired program(s). A decoder would also be able to monitor multiple programs.

MPEG provides an accurate mechanism for correctly timing the decoding, decompression, and display of video & audio data at the decoder. It works for both CBR (Constant Bit Rate) and VBR (Variable Bit Rate) streams.

The System Time Clock (STC) has a granularity of 27 MHz. This is an even multiple of 90 kHz, which will accommodate nominal picture rates of 24 Hz, 25 Hz, 29.97 Hz, and 30 Hz. Audio sample rates can also be recovered from this clock.

Time stamps are inserted by the MPEG Encoder into the bit stream at adequate rates along with the video & audio data. The time stamps are extracted by the MPEG Decoder from the bit stream and are used to perform various functions.

In the Transport Stream, three time stamps are utilized: the Program Clock Reference (PCR), the Decoding Time Stamp (DTS), and the Presentation Time Stamp (PTS). In the Program Stream, the System Clock Reference (SCR) performs a similar function to the PCR.

The DTS notifies the MPEG Decoder when the data must be removed from its decoder buffer. It keeps the decoder buffer from overruns and underruns.

The PTS notifies the MPEG Decoder when the data must be displayed. It also guarantees synchronization between video & audio streams.

The PCR (or SCR) carries 42 bit timestamps of the STC. This allows elapsed times of over 24 hours to have distinct coded values. At the decoder, the PCR values are used to lock a local clock circuit to the same frequency as the STC.

For the Program Stream, the System Clock Reference (SCR) must be sent at least every 700 milliseconds. Only one SCR is used for the whole stream.

For the Transport Stream, the Program Clock Reference (PCR) must be sent at least every 100 milliseconds. Each audio or video stream contains its own PCR. This can introduce a large amount of overhead if hundreds of video and audio programs are transmitting on the network.

When GPS is used in conjunction with MPEG encoding and decoding, all timestamp references should not have to be continuously transmitted. The synchronization function is performed by the GPS Receiver at each end. The timestamp references will have to be sent at least once during initialization of a program or when functions are initiated, such as Play, Fast Forward, etc.

Further, when GPS is used in conjunction with MPEG, SCR and PCR clock references do not have to be transmitted at all. For the Transport Stream, since each audio or video stream contains its own PCR, a large amount of unnecessary overhead can be reduced from the network. Additionally, the DTS and PTS timestamps do not have to be continuously transmitted and only have to be transmitted one time. $\Delta \tau$, the Constant Offset Bias, can be calculated from the first DTS or PTS received. For example, $\Delta \tau$=PTS−PCR (PTS and PCR must have been received at the same time).

It should be noted that GPS provides the method to recalibrate each system's Real Time Clock. For MPEG, a system's Real Time Clock is synonymous with the System Time Clock (STC).

In summary, GPS provides a method to recalibrate each system's Real Time Clock. A GPS receiver provides an accurate universal timestamp and each system can refresh its Real Time Clock using the GPS timestamp. The end system does not have to rely on a synchronized ATM network to process isochronous video and audio data.

Since GPS provides a common universal timestamp to each system, Adaptive Clock Recovery methods for Constant Bit Rate (CBR) and Variable Bit Rate (VBR) isochronous traffic are significantly simplified and the endpoints do not have to be dependent on the network clocks.

One side benefit of using a common universal timestamp is that precise cell transfer delays through the entire ATM network can be monitored and statistics can be maintained at the customer premise switch and/or at the end points.

Network performance information and statistics can also be maintained and analyzed.

Another side benefit is that a Network Management Station (NMS) can provide or be provided with the common universal timestamp.

Another side benefit is that if GPS is used in conjunction with MPEG encoding and decoding, network traffic can be significantly reduced, since clock references do not have to be transmitted along with video, audio, and user data.

While the particular embodiments of the invention have been described in detail, it should be understood that the invention may be implemented through alternative embodiments. Thus, the scope of the invention is not intended to be limited to the embodiments described, but is to be defined by the appended claims.

What is claimed is:

1. A system for transmitting data comprising:

(a) at least one sending terminal, including a first time clock, for sending a data stream containing a plurality of data segments being represented from data segment (1) to data segment (n), a data segment (i) (i=1, 2, ..., n) containing a time signal $T_{send}$ (i) (i=1, 2, ..., n) set by said first time clock for indicating sending time for the data segment (i);

(b) at least one receiving terminal, including a second time clock, for receiving said data stream including said data segments from data segment (1) to said data segment (n), said data segment (i) (i=1, 2, ..., n) being received at time $T_{destination}$ (i) set by said second time clock, said first and second time clocks being calibrated by a calibrating time signal wirelessly received from a common source;

(c) a processor logic, located at said receiving terminal, for generating a constant time offset bias by measuring time delay $T_{delay}$ (i) between said time signal $T_{send}$ (i) and said $T_{destination}$ (i), (i=1, 2, ..., n); and (d) a transmitting circuit for transmitting said data segment (i) (i=1, 2, ..., n) at the time of said $T_{send}$ (i) adjusted by said time constant offset bias.

2. The system of claim 1, wherein said calibrating time signal is from one or more GPS satellites.

3. The system of claim 2, further comprising:

a first receiver, coupled to said sending terminal, for receiving said time signal; and a second receiver, coupled to said receiving terminal, for receiving said calibrating time signal.

4. A system for transmitting data comprising:

(a) at least one sending terminal, including a first time clock, for sending a data stream containing a plurality of data segments being represented from data segment (1) to data segment (n), a data segment (i) (i=1, 2, ..., n) containing a time signal $T_{send}$ (i) (i=1, 2, ..., n) set by said first time clock for indicating sending time for the data seament (i);

(b) at least one receiving terminal, including a second time clock, for receiving said data stream including said data segments from data segment (1) to said data segment (n), said data segment (i) (i=1, 2, ..., n) being received at time $T_{destination}$ (i) set by said second time clock, said first and second time clocks being calibrated by a calibrating time signal wirelessly received from a common source;

(c) a switching circuit being able to transmitting data between said one sending terminal and said one receiving terminal; and (d) a receiver, coupled to said switching circuit, for receiving said calibrating time signal, said received calibrating time signal being broadcasted to said sending and receiving terminals via said switching circuit.

5. The system of claim 4, wherein said switching circuit is an ATM switch.

6. The system of claim 1, wherein said constant time offset bias is the maximum among said $T_{delay}$ (i) (i=1, 2, ..., n).

7. The system of claim 1, wherein said network is an ATM network, and each of said data segments (1-n) contains a plurality of ATM cells.

8. The system of claim 7, wherein said sending terminal further comprises:

an ATM layer processor that processes said calibrating time signal for said first time clock.

9. The system of claim 7, wherein said receiving terminal further comprises:

an ATM layer processor that processes said calibrating time signal for said second time clock.

10. The system of claim 1, wherein said data stream is an isochronous data stream.

11. The system of claim 1, said system being adaptable to MPEG format.

12. The system of claim 1, wherein said transmitting circuit transmits said data segment (i) (i=1, 2, ..., n) at the time of said $T_{send}$ (i) plus said time constant offset bias.

13. A method used with a system for transmitting data, said system including at least one sending terminal and at least one receiving terminal, said method comprising the steps of:

(a) at said one sending terminal, sending a data stream containing a plurality of data segments being represented from data segment (1) to data segment (n), data segment (i) (i=1, 2, ..., n) denoting an ith data segment;

(b) including a time signal $T_{send}$ (i) (i=1, 2, ..., n) set by a first time clock at said one sending terminal into said data segment (i) (i=1, 2, ..., n);

(c) at said one receiving terminal, receiving said data stream including said data segments from said data segment (1) to said data segment (n);

(d) indicating receiving time $T_{destination}$ (i) (i=1, 2, ..., n) for said data segment (i) (i=1, 2, ..., n) at said one receiving terminal set by a second time clock;

(e) calibrating said first and second time clocks using a calibrating time signal wirelessly received from a common source;

(f) at said receiving terminal, generating a constant time offset bias by measuring time delay $T_{delay}$ (i) between said $T_{send}$ (i) and said $T_{destination}$ (i), (i=1, 2, ..., n); and (g) outputting said data segment (i) (i=1, 2, ..., n) at the time of $T_{send}$ (i) adjusted by said constant time offset bias.

14. The method of claim 13, wherein in said step (e) said calibrating time signal is generated from one or more GPS satellites.

15. The method of claim 13, said system including a first receiver coupled to said sending terminal, a second receiver coupled to said receiving terminal, said step (e) further comprising the steps of:

at said first receiver, receiving said calibrating time signal; and at said second receiver, receiving said calibrating time signal.

16. The method of claim 13, said system including a switching circuit for transmitting data between said one sending terminal and said one receiving terminal and a receiver coupled to said switching circuit, said step (e) further comprising the steps of:

at said receiver, receiving said switching circuit time signal from one or more resources; and broadcasting said received switching circuit time signal to said sending and receiving terminals via said switching circuit.

17. The method of claim 13, said step (g) outputting said data segment (i) (i=1, 2, . . . , n) at the time of $T_{send}$ (i) plus said constant time offset bias.

18. A system for transmitting data comprising:

(a) at least one sending terminal, including a first time clock, for sending a data stream containing a plurality of data segments being represented from data segment (1) to data segment (n), a data segment (i) (i=1, 2, . . . , n) containing a time signal $T_{send}$ (i) (i=1, 2, . . . , n) set by a first time clock for indicating sending time for the data segment (i) (i=1, 2, . . . , n), said first time clock being located at said sending terminal;

(b) at least one receiving terminal, including a second time clock, for receiving said data stream including said data segments from said data segment (1) to said data segment (n), said data segment (i) (i=1, 2, . . . , n) being received at time $T_{destination}$ (i) set by said second time clock, said second time clock being located at said receiving terminal;

(c) a first receiving circuitry, located at said receiving terminal, for receiving a time signal wirelessly sent from a time signal source; and (d) a second receiving circuitry, located at said sending terminal, for receiving said time signal wirelessly sent from said time signal source;

said time signal wirelessly received from said time signal source being used to periodically calibrate said first and second time clocks.

19. A method used with a system for transmitting data, said system including at least one sending terminal and at least one receiving terminal that are coupled to said network, said method comprising the steps of:

(a) at said one sending terminal, sending a data stream containing a plurality of data segments being represented from data segment (1) to data segment (n), data segment (i) (i=1, 2, . . . , n) denoting an ith data segment;

(b) including a time signal $T_{send}$ (i) (i=1, 2, . . . , n) set by a first time clock at said one sending terminal into said data segment (i) (i=1, 2, . . . , n);

(c) at said one receiving terminal, receiving said data stream including said data segments from said data segment (1) to said data segment (n);

(d) indicating receiving time $T_{destination}$ (i) (i=1, 2, . . . , n) for the data segment (i) (i=1, 2, . . . , n) at said one receiving terminal set by a second time clock;

(e) at said one sending terminal, receiving a time signal from a time signal source; and (f) at said one receiving terminal, receiving said time signal from said time signal source; and (g) periodically calibrating said first time clock using said time signal wirelessly received at said one sending terminal, and periodically calibrating said second time clock using said time signal wirelessly received at said receiving terminal.

* * * * *